United States Patent
Basrur et al.

(10) Patent No.: US 9,436,527 B2
(45) Date of Patent: Sep. 6, 2016

(54) MEMORY MANAGEMENT OF A DEVICE ACCESSING APPLICATIONS

(71) Applicants: Hemanth Basrur, Bangalore (IN); Pawan Deshpande, Bangalore (IN); Keshav Gupta, Bangalore (IN); Basavantappa Bandiwaddar, Bangalore (IN)

(72) Inventors: Hemanth Basrur, Bangalore (IN); Pawan Deshpande, Bangalore (IN); Keshav Gupta, Bangalore (IN); Basavantappa Bandiwaddar, Bangalore (IN)

(73) Assignee: Sybase, Inc., Dublin ( * ) Notice: Subject to any disclaimer, the term of this patent is extended or adjusted under 35 U.S.C. 154(b) by 0 days.

(21) Appl. No.: 14/561,287

(22) Filed: Dec. 5, 2014

(65) Prior Publication Data

US 2016/0162342 A1   Jun. 9, 2016

(51) Int. Cl.
  *G06F 3/00* (2006.01)
  *G06F 9/44* (2006.01)
  *G06F 9/46* (2006.01)
  *G06F 13/00* (2006.01)
  *G06F 9/54* (2006.01)
  *G06F 9/445* (2006.01)

(52) U.S. Cl.
  CPC ............... *G06F 9/541* (2013.01); *G06F 8/61* (2013.01)

(58) Field of Classification Search
  None
  See application file for complete search history.

(56) References Cited

U.S. PATENT DOCUMENTS

| 7,383,332 B2 * | 6/2008 | Chong | H04L 67/16 709/223 |
| 7,657,573 B1 * | 2/2010 | Hancsarik | G06F 9/541 707/809 |
| 2013/0219173 A1 * | 8/2013 | Ho | G06F 21/33 713/157 |
| 2014/0068610 A1 * | 3/2014 | Baluch | G06F 12/023 718/1 |
| 2014/0108793 A1 * | 4/2014 | Barton | G06F 21/6218 713/165 |
| 2014/0380302 A1 * | 12/2014 | Ambasta | G06F 8/61 717/175 |

OTHER PUBLICATIONS

Palanivel Kodeswaran et al., "Securing Enterprise Data on Smartphones using Run Time Information Flow Control," Jul. 22, 2012, IEEE, pp. 300-305, retrieved from http://ieeexplore.ieee.org/stamp/stamp.jsp?tp=&arnumber=6341406 on Nov. 9, 2015.*

* cited by examiner

*Primary Examiner* — H S Sough
*Assistant Examiner* — William C Wood

(57) ABSTRACT

Various embodiments of systems and methods to provide memory management of a device accessing applications are described herein. In one aspect, a request is received to access an application on a device. Further, a check is performed to determine whether the application is enterprise application or personal use application. When the application is personal use application, access to the application is provided by installing the personal use application on the device. The personal use application utilizes at least a portion of an available general memory and a portion of an available corporate memory in the device.

20 Claims, 5 Drawing Sheets

MEMORY MANAGEMENT OF A DEVICE ACCESSING APPLICATIONS

BACKGROUND

Enterprises and organizations (e.g., corporations, partnerships, governments, academic institutions, etc.) maintain enterprise networks that allow enterprise users to access enterprise resources, such as hardware and software applications. For example, the enterprise applications may include email, customer relationship management (CRM), document management, enterprise resource planning (ERP) and data controlled by the enterprise. Also, the enterprises allow remote access to the enterprise applications. For example, when enterprise users are not in the enterprise network, the enterprises allow enterprise users to access the enterprise network via devices, such as smartphones, tablet computers, personal digital assistants (PDA), and the like.

Further, the enterprises deploy enterprise mobility management (EMM) solutions to assist in the management and control of remote access to the enterprise applications. The EMM solutions could manage devices through mobile device management (MDM) frameworks. The EMM solutions allow the enterprises to issue devices to enterprise users, which may be intended exclusively for business use. The enterprises maintain control over such devices, their applications and data. The enterprises may also allow the enterprise users to use their own devices for corporate purposes (a scenario known as bring your own device (BYOD)). BYOD programs allow the enterprise users to utilize personal devices for both personal and business use. As the BYOD programs gain momentum and popularity amongst employers and employees, the concern to ensure balanced memory usage between the enterprise applications and personal use applications in the device grows as well.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to provide memory management of a device accessing applications are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
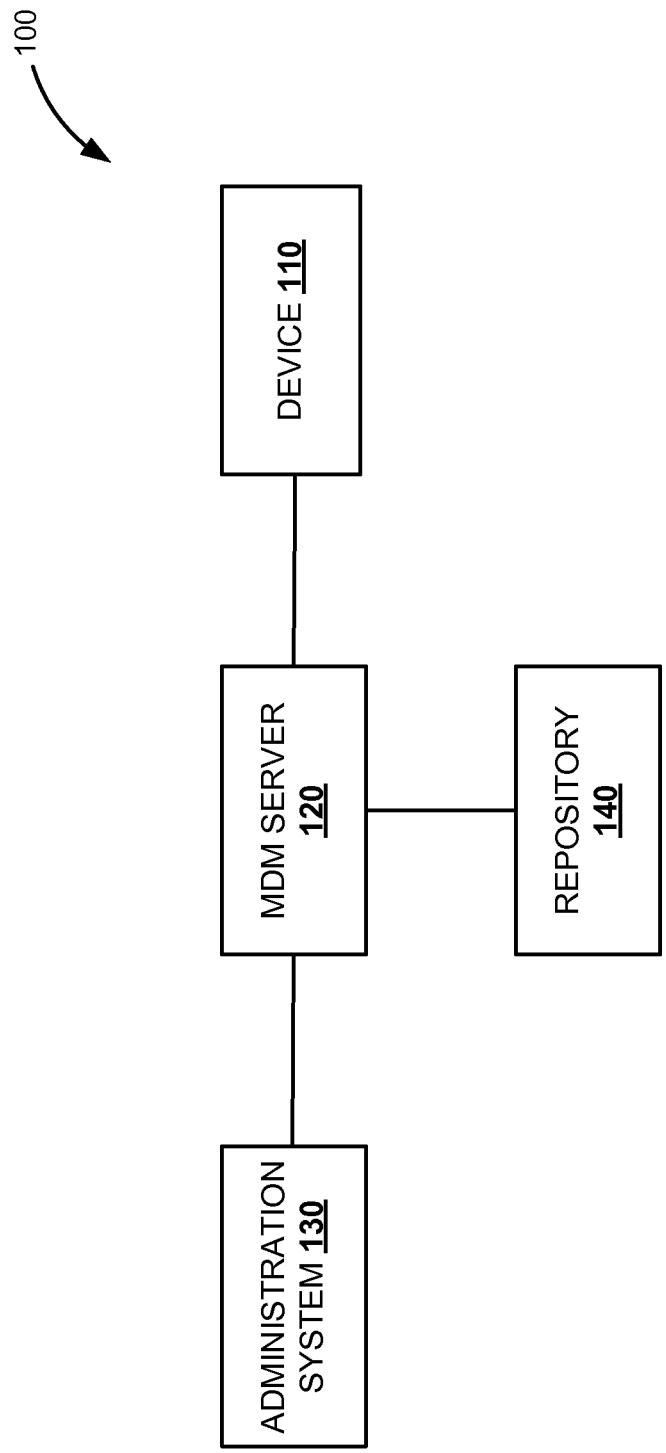
FIG. 1 is a high-level block diagram illustrating a system for resource management of a device, according to an embodiment.

FIG. 1 is a high level block diagram illustrating system 100 for resource management of device 110, according to an embodiment. The system 100 includes various software and hardware components or modules that may employ a method to manage resource such as memory in the device 110. The various modules may be implemented as computer-readable storage memories including computer-readable instructions (i.e., software) for execution by a processor. The modules may perform the various tasks associated with enrolling, configuring and installing an application in the device 110. The system 100 also includes both hardware and software applications, as well as data communications channels for communicating data between the various hardware and software components.

In one embodiment, an enrollment policy, a configuration policy and an application policy can be set up for devices (e.g., the device 110) to get connected to an enterprise network through mobile device management (MDM) server 120. The enrollment policy, the configuration policy and the application policy are set up by an administrator of an enterprise using administration system 130, for instance.

The MDM server 120 manages the devices (e.g., the device 110) such as, but not limited to smartphones, tablets, laptops and mobile feature phones, that are connected to an enterprise network. For example, SAP® Afaria is the MDM software for securing and managing enterprise and personal devices with a company's enterprise policies. Further, the enrollment policy enrolls devices, define device settings, secure devices and data and collect hardware/software inventory. In other words, the enrollment policy establishes connection between the device 110 and the MDM server 120, and the MDM server 120 manages the enterprise applications in the device 110.

For example, the device 110 is enrolled to the MDM server 120 through a front component such as a self-service portal (SSP). The SSP may include an interface for communicating applications to the MDM server 120. In one example, the SSP may be implemented as a web-based application that executes with web browser application. When the SSP is implemented as a web-based application, the SSP may use the memory and processing resources of the administrator system 130 and the device 110. In other embodiments, the portal may be implemented as a web-browser plug-in.

An enterprise user can enroll the device 110 with the MDM server 120 by login into the SSP using enterprise user's active directory (AD), lightweight directory access protocol (LDAP), windows credential and the like. Further, the enterprise user can control the device 110 like locking the device, unlocking the device, wiping out the device content and so on through the SSP. Also, the enterprise user can download the enterprise applications through the SSP. Therefore, by enrolling the device 110 with MDM server 120, the device 110 is authorized to install enterprise applications.

The configuration policy allows the administrator to ensure that the enrolled devices (e.g., device 110) are protected through a set of security policies to access the enterprise applications. The configuration policy can also define device settings and options, and collect device hardware/software inventory and activity expense management data and store in repository 140 along with an international mobile station equipment identity (IMEI), specific to the device, for instance. Further, the application policy can define enterprise application packages that determine the enterprise applications available for the device 110.

In one embodiment, the administrator can define in the configuration policy the amount of corporate memory, from total memory of the device, required to run the enterprise applications in the devices. The remaining portion of the memory is allocated for personal use. Personal use may include utilizing the remaining portion of memory assigned for personal use to access non-enterprise applications, for example, a gaming application. The non-enterprise applications can be referred as personal use applications. Further, the defined corporate memory is stored in the repository 140. For example, the administrator defines 75% of the device memory as the corporate memory or 3 GB memory as the corporate memory. Further during enrollment, the enterprise user can modify the amount of the defined corporate memory and the modified amount is updated in the repository 140. For example, the repository 140 includes device memory allocation details as depicted in Table 1.

TABLE 1

| Defined corporate memory percentage | Device total memory | Allocated corporate memory | Total memory in use by enterprise applications | Available corporate memory | Available general memory |
|---|---|---|---|---|---|
| 50% | 1000 MB | 500 MB | 300 MB | 200 MB | 250 MB |

The repository 140 includes the percentage of defined corporate memory and an allocated corporate memory. Further, the repository includes a device total memory, a total memory in use by the enterprise applications and an available corporate memory to run a new enterprise application, which can used to check whether the new enterprise application can be pushed to the device 110. The repository also includes an available general memory in the device 110.

In one embodiment, when a request to access an application on the device 110 is received, a check is performed to determine whether the application is an enterprise application or a personal use application. When the application is the personal use application, access to the personal use application is provided by installing the personal use application on the device 110. The personal use application may utilize a portion of the available general memory in the device 110 and also a portion of memory that has been allocated for corporate use (e.g., the available corporate memory).

In other words, the personal use application may access the portion of memory allocated for corporate use when the memory allocated for personal use has been utilized. For example, assume that 50% of a 100 MB device memory is defined as corporate memory. In this case, the remaining 50% of memory (50 MB) is defined as memory for personal use. A user downloads a personal use application 1 of 50 MB. In this case, when a user wants to download another personal use application 2 of 10 MB then this application may utilize 10 MB of the available corporate memory. Further, based on the memory utilization by the personal use application, the available corporate memory is updated in the repository 140. In one exemplary embodiment, when the available general memory and the available corporate memory is not sufficient to access the personal use application, an alert message is sent to the enterprise user and based on the alert message, the enterprise user can modify the amount of the allocated corporate memory. In this way, the memory utilization for personal usage and corporate usage is better managed.

In one embodiment, when the request to access the enterprise application is received, the information stored in the repository specific to the device 110 is retrieved. Further, a check is performed to determine whether the available corporate memory is enough for pushing the requested enterprise application. Based on the available corporate memory to access the enterprise application, access to the requested enterprise application is provided by pushing the requested enterprise application to the device 110.

In one embodiment, when there is no enough available corporate memory to push the requested enterprise application, an alert message is sent to the device. Further, the enterprise user is provided with an option to increase the defined corporate memory for accessing enterprise applications and/or delete one or more existing enterprise application in the device so that the requested enterprise application can be installed.

Figure 2:
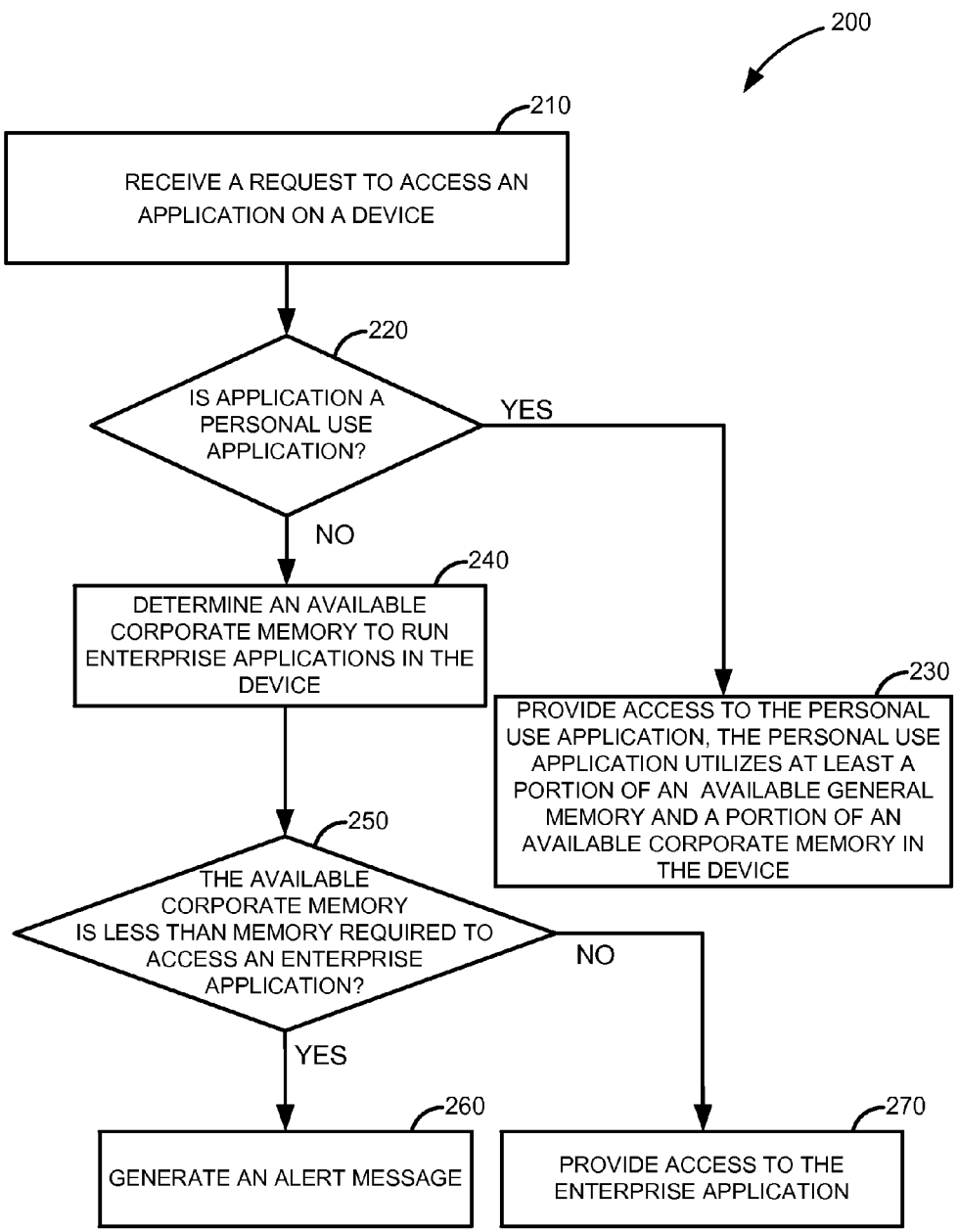
FIG. 2 is a flow diagram illustrating a process for memory management of a device accessing applications, according to an embodiment.

FIG. 2 is a flow diagram illustrating process 200 for memory management of a device accessing applications, according to an embodiment. The process 200 may include one or more functions or routines in the form of non-transitory computer-executable instructions that are stored in a tangible computer-readable storage medium and executed using a processor of a computing device. The routines may be included as part of the modules or instructions described in FIG. 1.

At 210, a request is received to access an application on the device. The request to access the application can be received from an enterprise user of the device and/or can be initiated by an administrator of an enterprise.

At 220, a check is performed to determine whether the application is a personal use application or an enterprise application. In case the application is a personal use application, then access to the personal use application is provided by installing the personal use application on the device, at 230. In one embodiment, the personal use application may utilize a portion of an available general memory of the device and also a portion of an available corporate memory when the available general memory has been utilized. The available general memory of the device is remaining memory in the device after allocating memory for enterprise application use. Further, in case when the available general memory and the available corporate memory are not sufficient to provide access to the personal use application, an alert message is sent to the enterprise user to modify an allocated corporate memory so that the access to the personal use application can be provided. The alert message can be in a form of, but not limited to an email or a pop-up notification such as Apple Push Notification Service (APNS) or Google Cloud Messaging (GCM) notification.

At 240, when the requested application is the enterprise application, the available corporate memory to run the enterprise applications in the device is determined The available corporate memory can be determined based on an allocated corporate memory to access the enterprise applications and a memory in use by enterprise applications installed in the device. In one exemplary embodiment, the determined available corporate memory can be stored in a repository. For example, if the allocated corporate memory is 500 MB and the memory in use by the enterprise application is 300 MB, then the available corporate memory is 200 MB (i.e., 500 MB-300 MB)

At 250, a check is performed to determine whether the available corporate memory is less than a memory required to access the requested enterprise application. For example, consider memory required for a leave request application is 400 MB and the available corporate memory is 200 MB. The available corporate memory is less than the memory required to install the leave request application.

At 260, an alert message is generated when the available corporate memory is less than the memory required to provide access to the enterprise application. The alert message can be in a form of, but not limited to an email or a pop-up notification such as Apple Push Notification Service (APNS) or Google Cloud Messaging (GCM) notification. In the example, the available corporate memory (e.g., 200 MB) is less than the memory required to install the leave request application (e.g., 400 MB). Thereby, the alert message depicting not enough memory to access the leave request application is sent to the device. Further, the enterprise user is provided an option to increase a defined corporate memory, and/or request the administrator to uninstall one or more enterprise applications installed in the device which are not used and/or clear a cache memory (e.g., delete data associated with the enterprise applications) so that the leave request application can be pushed to the device.

At 270, when the available corporate memory is not less than the memory required to access the enterprise application, access to the enterprise application is provided in the device.

In one embodiment, an alert message stating there is no more memory for running one or more enterprise applications is generated when a memory usage by the enterprise applications running in the device exceeds the memory allocated to the enterprise applications in the device.

It is appreciated that the process 200 can be implemented while providing access not only to the enterprise applications, but also to market applications in the device. Market applications are business applications spanned over different vendors like Apple® (e.g., Apple® application store), Android® (e.g., Google® play), Windows® Phone (e.g., Windows® phone store) and any third party application stores. Thereby, the enterprise user can have control on allocating memory of the device for personal use as well as for other applications (e.g., the enterprise applications, the market applications and any third party applications).

Figure 3:
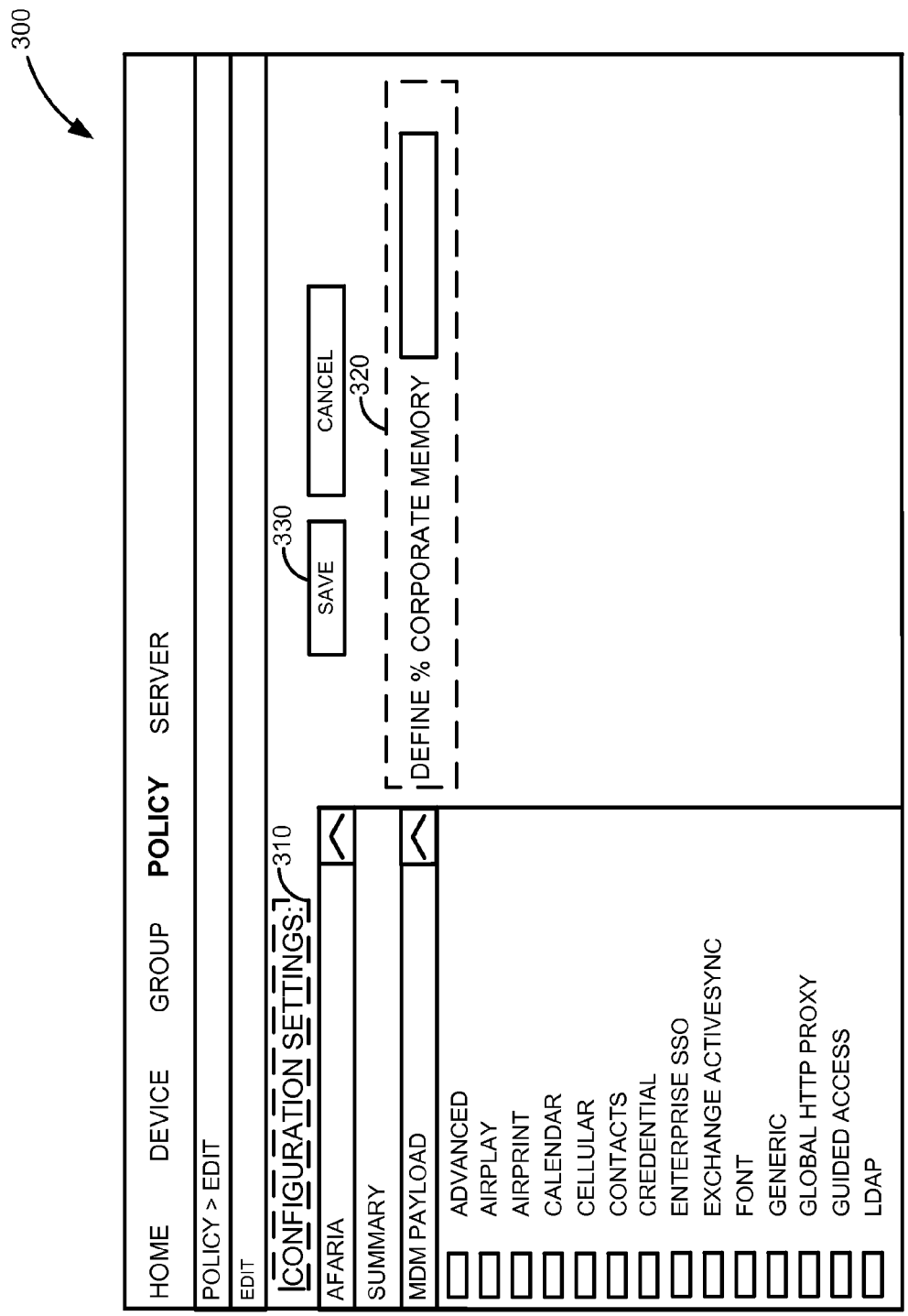
FIG. 3 is a block diagram illustrating an exemplary graphical user interface (GUI) for defining corporate memory percentage by an enterprise administrator, according to an embodiment.

FIG. 3 is a block diagram illustrating exemplary graphical user interface (GUI) 300 for defining corporate memory percentage by an enterprise administrator, according to an embodiment. A configuration policy can allow the enterprise administrator to define a percentage of corporate memory required to run the enterprise applications in devices using a self-service portal (SSP). The GUI 300 depicts the SSP, where the configuration settings can be edited (e.g., 310). In the configuration settings, an option to define percentage of corporate memory (e.g., 320) is provided for the enterprise administrator. Further, the defined percentage of corporate memory can be saved using the option "save" 330.

Figure 4:
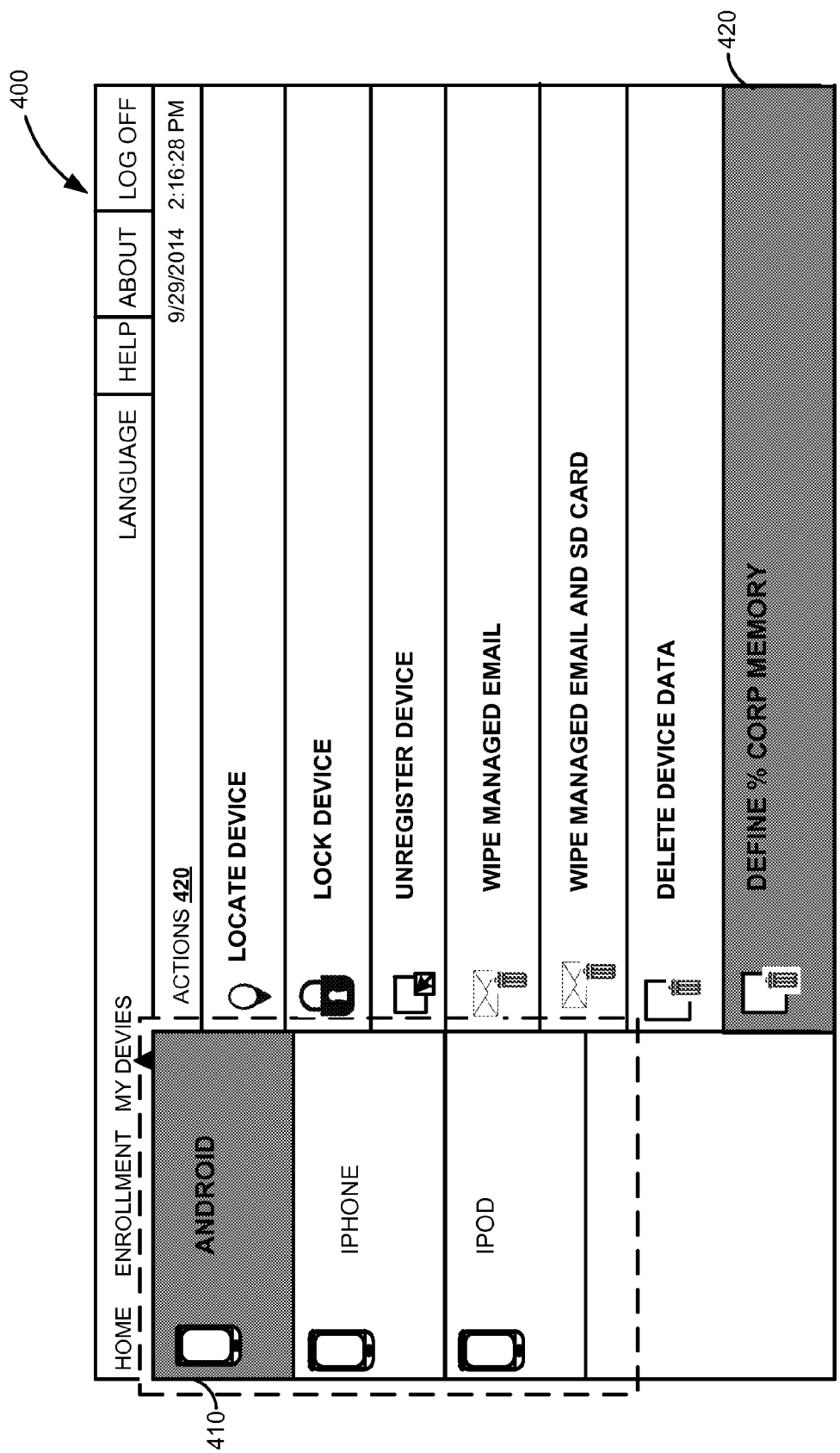
FIG. 4 is a block diagram illustrating an exemplary graphical user interface (GUI) for defining corporate memory percentage by an enterprise user, according to an embodiment.

FIG. 4 is a block diagram illustrating an exemplary graphical user interface (GUI) 400 for defining corporate memory percentage by an enterprise user, according to an embodiment. The GUI 400 depicts a self-service portal (SSP), where one or more devices of the enterprise user are listed (e.g., 410). The enterprise user can choose a device from the list. In the example, the enterprise user chooses "ANDROID" phone. Further, a list of actions 420 are rendered on the GUI 400 such as, but not limited to "locate device", where a current location of the device can be retrieved; "lock device", where the enterprise user can disable buttons on the device; "unregister device", where the enterprise user can remove the device from the SSP; "wipe managed email", where the enterprise user can remove management email accounts and user data associated with the emails from the device; "wipe managed email and secure digital (SD) card", where the enterprise user can remove managed email accounts, user data associated with the emails and the SD card from the device; "delete device data", where the enterprise user can remove the device from a mobile device management (MDM) software; and "define percentage corporate memory." In one embodiment, the option "define percentage corporate memory" (e.g., 420) provides the enterprise user to define or modify a defined percentage of corporate memory by the administrator of an enterprise.

Thereby, by providing an option to the enterprise user to define the corporate memory, the device is provisioned for both personal and office use. Further, memory resources of the device can be assigned or allocated for corporate use and personal use.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and read only memory (ROM) and random access memory (RAM) devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
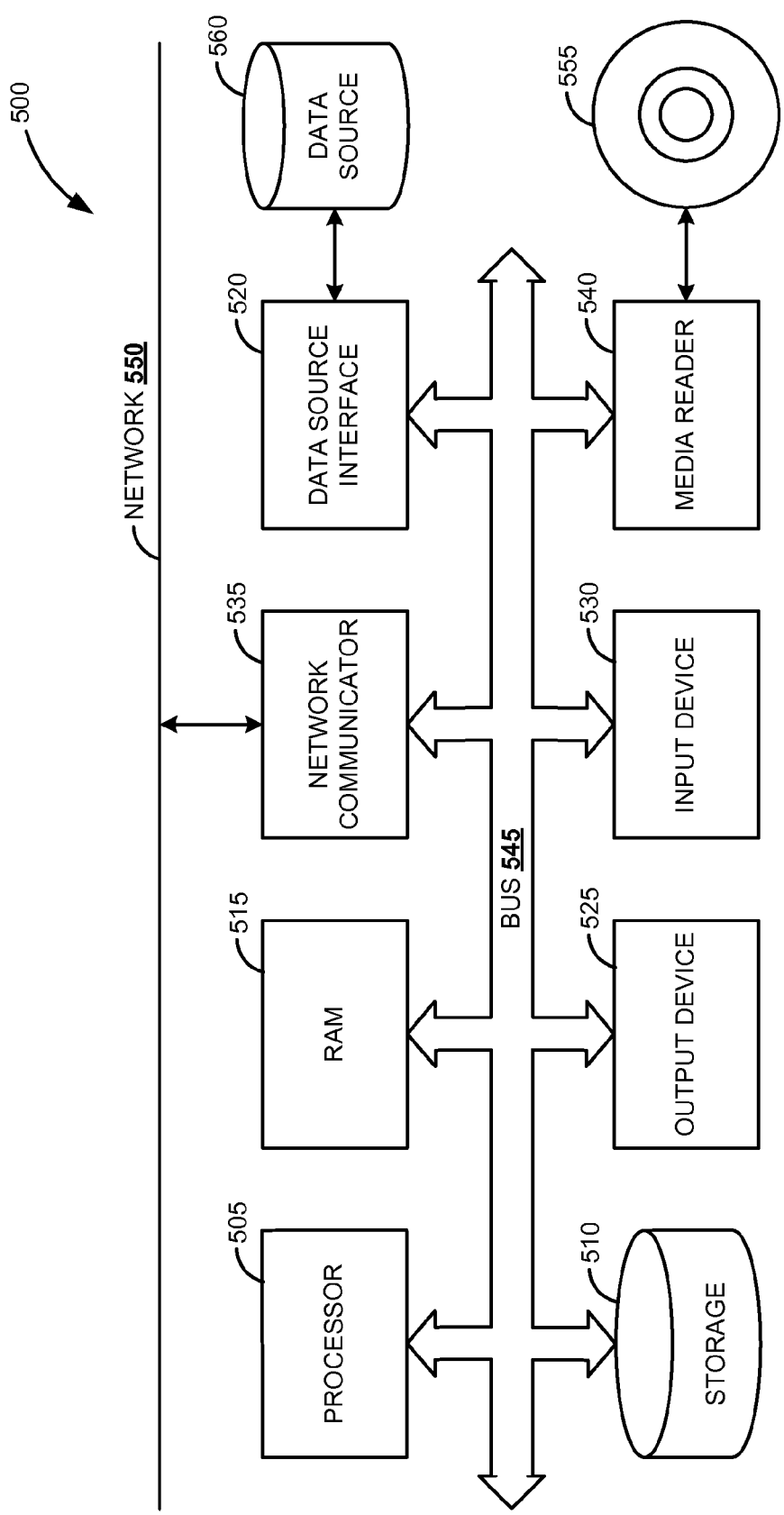
FIG. 5 is a block diagram of an exemplary computer system, according to an embodiment.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in RAM 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., enterprise resource planning (ERP) system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to perform operations comprising:
   receiving a request to access an application in a device;
   determining whether the application is one of an enterprise application and a personal use application;
   determining whether an available general memory is sufficient for installing the personal use application when the application is the personal use application;
   determining whether the available general memory and an available corporate memory are sufficient for installing the personal use application when the available general memory is not sufficient for installing the personal use application;
   providing access to the personal use application by installing the personal use application on the device when the available general memory and the available corporate memory are sufficient for installing the personal use application; and
   generating an alert message to modify a memory used by one or more enterprise applications running in the device when the available general memory and the available corporate memory are not sufficient for installing the personal use application.

2. The non-transitory computer-readable medium of claim 1, further comprising instructions, which when executed by the computer cause the computer to perform operations comprising:
   determining the available corporate memory to run enterprise applications in the device when the application is the enterprise application;
   determining whether the available corporate memory is less than memory required to access the enterprise application;
   providing access to the enterprise application by installing the enterprise application on the device when the available corporate memory is not less than memory required to access the enterprise application; and
   generating an alert message when the available corporate memory is less than the memory required to run the enterprise application.

3. The non-transitory computer-readable medium of claim 2, further comprising instructions, which when executed cause the computer system to: generate an alert message when the memory used by the one or more enterprise applications running in the device exceeds the memory allocated to run the enterprise applications in the device.

4. The non-transitory computer-readable medium of claim 1, wherein the request to access the application is received from one of an enterprise user of the device and an administrator of an enterprise.

5. The non-transitory computer-readable medium of claim 1, wherein the available corporate memory is determined from a memory allocated to run enterprise applications in the device and the memory used by the one or more enterprise applications running in the device.

6. The non-transitory computer-readable medium of claim 5, wherein the memory allocated to run the enterprise applications is defined by an administrator of an enterprise and the memory allocated is modified by an enterprise user.

7. The non-transitory computer-readable medium of claim 1, wherein the device is enrolled with an enterprise network to access enterprise applications through mobile device management (MDM) server.

8. The non-transitory computer-readable medium of claim 1, further comprising instructions, which when executed by the computer cause the computer to perform operations comprising: providing access to the personal use application by installing the personal use application on the device when the available general memory is sufficient for installing the personal use application.

9. A computer implemented method to provide memory management of a device accessing applications, the method comprising:
receiving a request to access an application in the device;
determining whether the application is one of an enterprise application and a personal use application;
determining whether an available general memory is sufficient for installing the personal use application when the application is the personal use application;
determining whether the available general memory and an available corporate memory are sufficient for installing the personal use application when the available general memory is not sufficient for installing the personal use application; and
providing access to the personal use application by installing the personal use application on the device when the available general memory and the available corporate memory are sufficient for installing the personal use application; and
generating an alert message to modify a memory used by one or more enterprise applications running in the device when the available general memory and the available corporate memory are not sufficient for installing the personal use application.

10. The computer implemented method of claim 9, further comprising:
determining the available corporate memory to run enterprise applications in the device when the application is the enterprise application;
determining whether the available corporate memory is less than memory required to access the enterprise application;
providing access to the enterprise application by installing the enterprise application on the device when the available corporate memory is not less than memory required to access the enterprise application; and
generating an alert message when the available corporate memory is less than the memory required to run the enterprise application.

11. The computer implemented method of claim 10, further comprising: generating an alert message when the memory used by the one or more enterprise applications running in the device exceeds the memory allocated to run the enterprise applications in the device.

12. The computer implemented method of claim 9, wherein the request to access the application is received from one of an enterprise user of the device and an administrator of an enterprise.

13. The computer implemented method of claim 9, wherein the available corporate memory is determined from a memory allocated to run enterprise applications in the device and the memory used by the one or more enterprise applications running in the device.

14. The computer implemented method of claim 13, wherein the memory allocated to run the enterprise applications is defined by an administrator of an enterprise and the memory allocated is modified by an enterprise user.

15. The computer implemented method of claim 9, wherein the device is enrolled with an enterprise network to access enterprise applications through mobile device management (MDM) server.

16. The computer implemented method of claim 9, further comprising: providing access to the personal use application by installing the personal use application on the device when the available general memory is sufficient for installing the personal use application.

17. A computer system to provide memory management of a device accessing applications, the computer system comprising:
at least one processor; and
one or more memory devices communicative with the at least one processor, wherein the one or more memory devices store instructions to:
receive a request to access an application in the device;
determine whether the application is one of an enterprise application and a personal use application;
determine whether an available general memory is sufficient for installing the personal use application when the application is the personal use application;
determine whether the available general memory and an available corporate memory are sufficient for installing the personal use application when the available general memory is not sufficient for installing the personal use application; and
provide access to the personal use application by installing the personal use application on the device when the available general memory and the available corporate memory are sufficient for installing the personal use application; and
generate an alert message to modify a memory used by one or more enterprise applications running in the device when the available general memory and the available corporate memory are not sufficient for installing the personal use application.

18. The computer system of claim 17, further comprising:
determine the available corporate memory to run enterprise applications in the device when the application is the enterprise application;
determine whether the available corporate memory is less than memory required to access the enterprise application;
provide access to the enterprise application by installing the enterprise application on the device when the available corporate memory is not less than memory required to access the enterprise application; and
generate an alert message when the available corporate memory is less than the memory required to run the enterprise application.

19. The computer system of claim 18, further comprising:
generating an alert message when the memory used by the one or more enterprise applications running in the device exceeds the memory allocated to run the enterprise applications in the device.

20. The computer system of claim 17, further comprising: providing access to the personal use application by installing the personal use application on the device when the available general memory is sufficient for installing the personal use application.

\* \* \* \* \*